US012705402B2

(12) United States Patent
Choi et al.

(10) Patent No.: US 12,705,402 B2
(45) Date of Patent: Aug. 11, 2026

(54) STORAGE DEVICE, OPERATING METHOD THEREOF, AND SYSTEM FOR PROVIDING APPLICATION-BY-APPLICATION SECURE STORAGE PLACE

(71) Applicant: Samsung Electronics Co., Ltd., Suwon-si (KR)

(72) Inventors: Myungsik Choi, Suwon-si (KR); Yunho Youm, Suwon-si (KR); Seungho Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 445 days.

(21) Appl. No.: 18/356,273

(22) Filed: Jul. 21, 2023

(65) Prior Publication Data

US 2024/0184931 A1 Jun. 6, 2024

(30) Foreign Application Priority Data

Dec. 1, 2022 (KR) ........................ 10-2022-0165967

(51) Int. Cl.
*G06F 21/78* (2013.01)
*G06F 21/33* (2013.01)
*G06F 21/60* (2013.01)

(52) U.S. Cl.
CPC .............. *G06F 21/78* (2013.01); *G06F 21/33* (2013.01); *G06F 21/602* (2013.01)

(58) Field of Classification Search
CPC .......... G06F 21/33; G06F 21/44; G06F 21/53; G06F 21/602; G06F 21/62; G06F 21/78; G06F 3/0622; G06F 3/0658; G06F 3/0659
See application file for complete search history.

(56) References Cited

U.S. PATENT DOCUMENTS 8,397,306 B1 3/2013 Tormasov
10,185,669 B2 1/2019 Hans et al.
10,303,900 B2 5/2019 Chhabra et al.
10,387,064 B2 8/2019 Kim
10,977,381 B2 4/2021 Mannan et al.
2016/0285638 A1* 9/2016 Pearson .............. G06F 12/1408
2022/0294614 A1* 9/2022 Liu ....................... H04L 9/0841
2023/0273808 A1* 8/2023 Atamli .................... G06F 21/53 718/1

FOREIGN PATENT DOCUMENTS

JP 6371184 B2 8/2018
KR 100959275 B1 5/2010
KR 100966236 B1 6/2010

OTHER PUBLICATIONS

Enterprise Self-Encrypting Drives, User Guide—Part 1, Seagate Technology LLC, 100515636, Rev. C, Sep. 2018.

* cited by examiner

*Primary Examiner* — Theodore C Parsons
(74) *Attorney, Agent, or Firm* — Harness, Dickey & Pierce, P.L.C.

(57) ABSTRACT

There is provided a method of operating a plurality of storage devices may include providing, by a first storage controller of a first storage device, resources required for execution of an application to a host device so that the host device executes the application; and allocating, by a second storage controller of a second storage device, a storage space to be used by the application executed in a trusted execution environment (TEE) area to the host device in units of applications based on identification information of the host device included in a allocation request.

20 Claims, 9 Drawing Sheets

Figure 1:
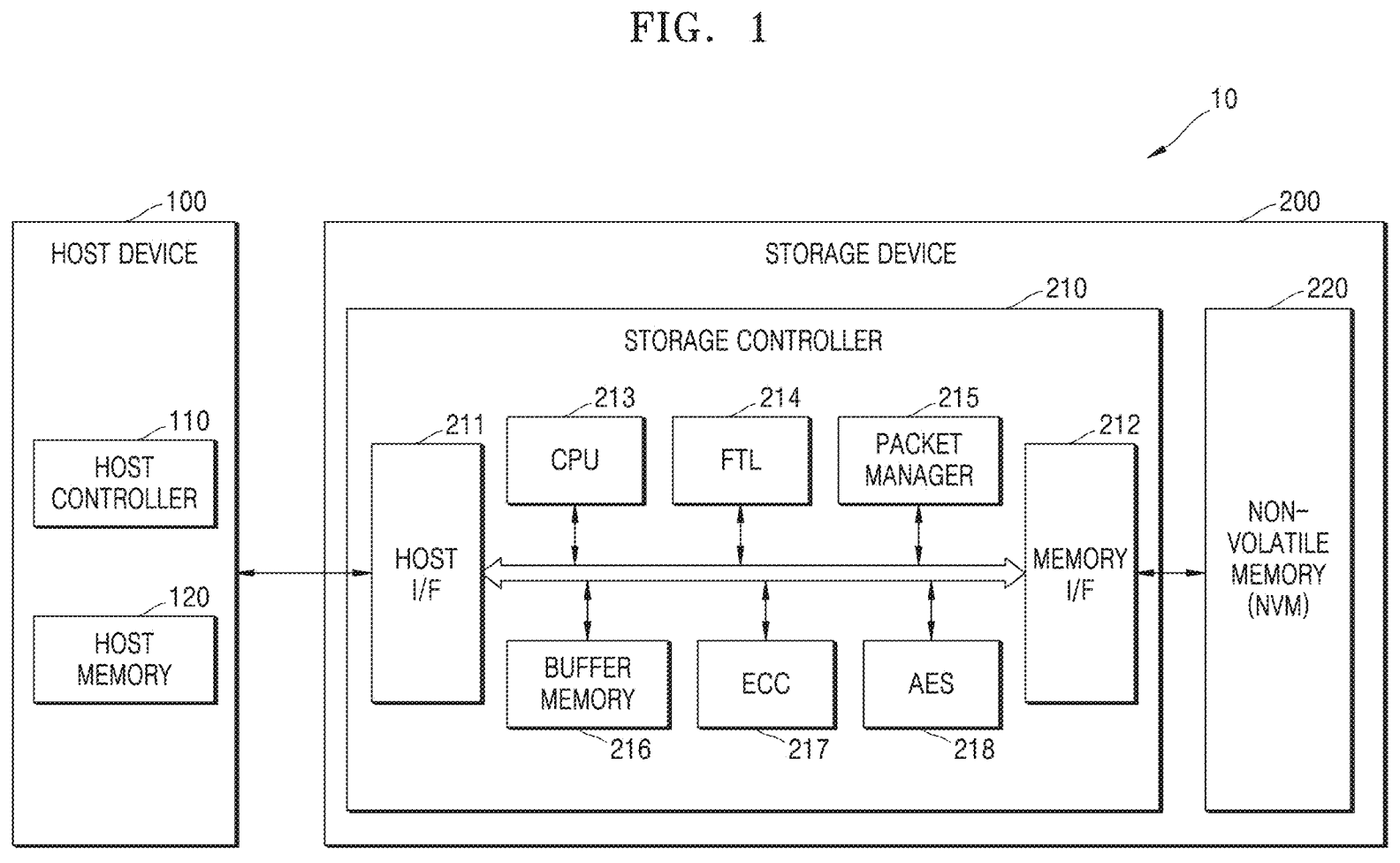

100 HOST DEVICE

110 HOST CONTROLLER

120 HOST MEMORY

200 STORAGE DEVICE

210 STORAGE CONTROLLER

211 HOST I/F

212 MEMORY I/F

213 CPU

214 FTL

215 PACKET MANAGER

216 BUFFER MEMORY

217 ECC

218 AES

220 NON-VOLATILE MEMORY (NVM)

20
HOST DEVICE
300
HOST CONTROLLER
310
HOST MEMORY
320
FIRST STORAGE DEVICE
400
FIRST STORAGE CONTROLLER
410
FIRST NON-VOLATILE MEMORY
420
SECOND STORAGE DEVICE
500
SECOND STORAGE CONTROLLER
510
SECOND NON-VOLATILE MEMORY
520
30
KERNEL
31
MIDDLEWARE
33
API
35
APPLICATION 1
37
APPLICATION 2
39
...
40
Data for APPLICATION 1
41
Data for APPLICATION 2
43
...

STORAGE DEVICE, OPERATING METHOD THEREOF, AND SYSTEM FOR PROVIDING APPLICATION-BY-APPLICATION SECURE STORAGE PLACE

CROSS-REFERENCE TO RELATED APPLICATION

This application is based on and claims priority under 35 U.S.C. § 119 to Korean Patent Application No. 10-2022-0165967, filed on Dec. 1, 2022, in the Korean Intellectual Property Office, the disclosure of which is incorporated by reference herein in its entirety.

BACKGROUND

The inventive concepts relate to storage devices for providing a safe storage space between an application and a storage device on an application-by-application basis, operating methods thereof, and systems for providing the safe storage space.

An apparatus configured to process data may perform various operations by accessing the storage device. For example, the apparatus may process data read from a storage device or write the processed data into a memory.

On the other hand, cloud and data center-based storage services are expanding. As these technologies change, the dependence of services (applications, programs, etc.) on an operating system (OS) or hypervisor is reduced, and the need for security isolation from storage devices by the service itself is emerging.

SUMMARY

The inventive concepts provide storage devices, operating methods thereof, and systems for providing a safe storage space between an application and a storage device on an application-by-application basis in a host-storage system.

According to some aspects of the inventive concepts, there is provided a method of operating a plurality of storage devices including providing, by a first storage controller of a first storage device, resources required for execution of an application to a host device so that the host device executes the application, receiving, by a second storage controller of a second storage device, a request for allocating a storage space corresponding to at least one application from the host device; and allocating, by the second storage controller, the storage space to be used by the application executed in a trusted execution environment (TEE) area to the host device in units of applications based on identification information of the host device included in the allocation request, the resources including at least one of a kernel, middleware, an application programming interface (API), or execution-related data of the application.

According to some aspects of the inventive concepts, there is provided a storage device including a first non-volatile memory and a second non-volatile memory that is different from the first non-volatile memory and a storage controller configured to provide a host device with resources required for execution of an application from the first non-volatile memory so that the host device executes the application, receive a request for allocating a storage space corresponding to at least one application from the host device, allocate the storage space to be used by the application executed in a trusted execution environment (TEE) area to the host device in the second non-volatile memory in units of applications based on identification information of the host device included in the allocation request, the resources including at least one of a kernel, middleware, an application programming interface (API), or execution-related data of the application.

In addition, according to some aspects of the inventive concepts, there is provided a host-storage system including a host device, and a plurality of storage devices including a first storage device including a first storage controller, and a second storage device including a second storage controller, the first storage controller of the first storage device being configured to provide the host device with resources required for execution of an application so that the host device executes the application, a the storage controller of the second storage device being configured to receive a request for allocating a storage space corresponding to at least one application from the host device, allocate a storage space to be used by the application executed in a trusted execution environment (TEE) area to the host device in units of applications based on identification information of the host device included in the allocation request, the resources including at least one of a kernel, middleware, an application programming interface (API), or execution-related data of the application.

BRIEF DESCRIPTION OF THE DRAWINGS

Example embodiments of the inventive concepts will be more clearly understood from the following detailed description taken in conjunction with the accompanying drawings in which:

FIG. 1 is a block diagram illustrating a host-storage system according to some example embodiments;

DETAILED DESCRIPTION OF THE EMBODIMENTS

Figure 2:
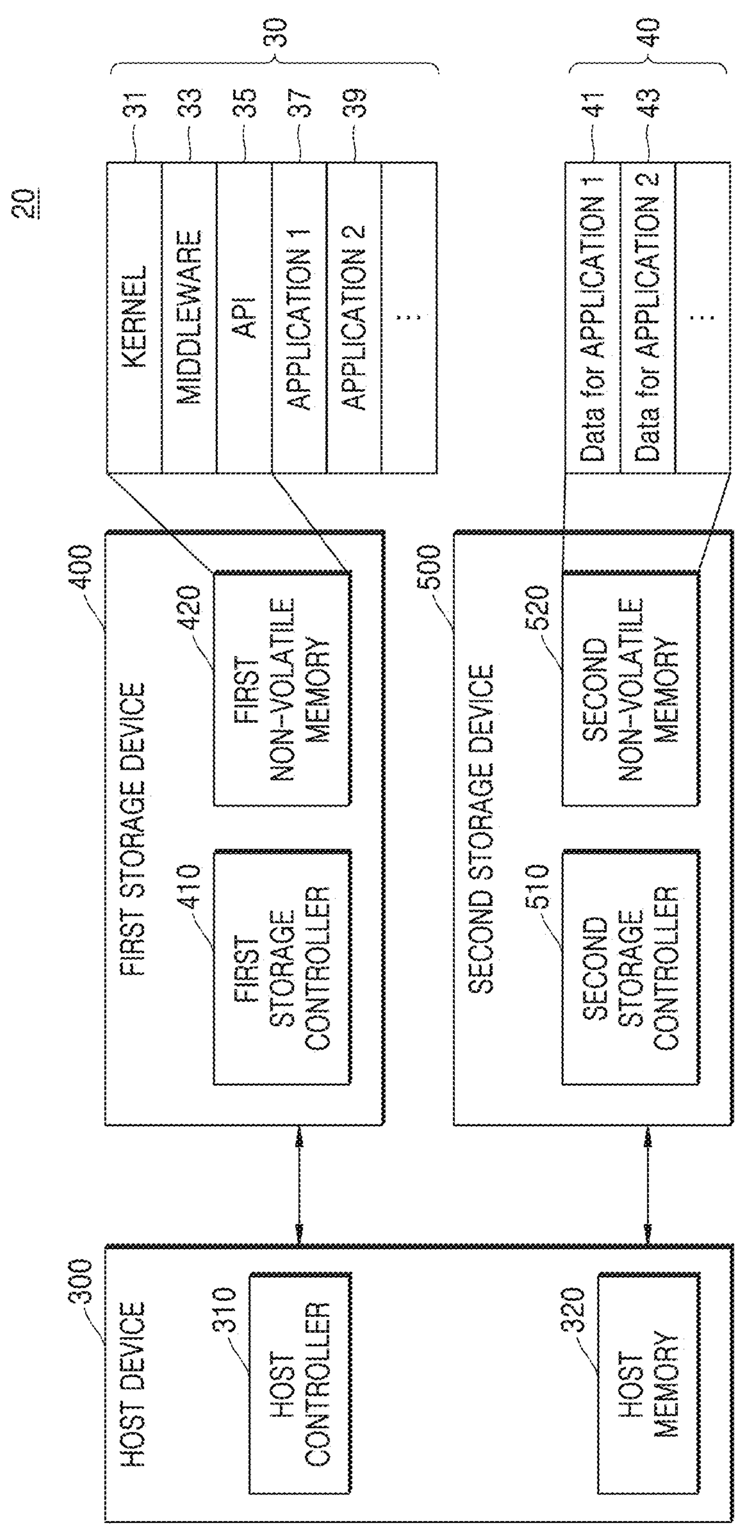
FIG. 2 is a block diagram illustrating a host-storage system according to some example embodiments.

Hereinafter, example embodiments of the present invention will be described in some example embodiments with reference to the accompanying drawings.

FIG. 1 is a block diagram illustrating a host-storage system 10 according to some example embodiments.

The host-storage system 10 may include a host device 100 and a storage device 200. In addition, the storage device 200 may include a storage controller 210 and a non-volatile memory (NVM) 220. In addition, according to some example embodiments, the host device 100 may include a host controller 110 and a host memory 120. The host memory 120 may function as a buffer memory for temporarily storing data to be transmitted to the storage device 200 or data transmitted from the storage device 200.

The storage device 200 may include storage media for storing data based on a request from the host device 100. As an example, the storage device 200 may include at least one of a solid state drive (SSD), an embedded memory, and/or a removable external memory. When the storage device 200 is an SSD, the storage device 200 may be a device conforming to the non-volatile memory express (NVMe) standard. When the storage device 200 is an embedded memory or an external memory, the storage device 200 may be a device conforming to a universal flash storage (UFS) standard or an embedded multi-media card (eMMC) standard. The host device 100 and the storage device 200 may each generate and transmit a packet based on an adopted standard protocol.

When the non-volatile memory 220 of the storage device 200 includes a flash memory, the flash memory may include a 2D NAND memory array or a 3D (or vertical) NAND (VNAND) memory array. As another example, the storage device 200 may include other types of non-volatile memories. For example, the storage device 200 may include magnetic RAM (MRAM), spin-transfer torque MRAM, conductive bridging RAM (CBRAM), ferroelectric RAM (FeRAM), phase RAM (PRAM), resistive memory (Resistive RAM), and/or other types of memory.

According to some example embodiments, the host controller 110 and the host memory 120 may be implemented as separate semiconductor chips. Alternatively, in some example embodiments, the host controller 110 and the host memory 120 may be integrated on the same semiconductor chip. As an example, the host controller 110 may be any one of a plurality of modules included in an application processor, and the application processor may be implemented as a system on chip (SoC). Also, the host memory 120 may be an embedded memory included in the application processor, or may be a non-volatile memory or a memory module disposed outside the application processor.

The host controller 110 may manage an operation of storing data (for example, write data) of a buffer area in the non-volatile memory 220 or an operation of storing data (for example, read data) of the non-volatile memory 220 in the buffer area.

The storage controller 210 may include a host interface 211, a memory interface 212, and a central processing unit (CPU) 213. In addition, the storage controller 210 may further include a flash translation layer (FTL) 214, a packet manager 215, a buffer memory 216, an error correction code (ECC) engine 217, and an advanced encryption standard (AES) 218 engine. The storage controller 210 may further include a working memory (not shown) into which the FTL 214 is loaded, and when the CPU 213 executes the FTL 214, data writing and reading operations to and from the non-volatile memory 220 may be controlled.

The host interface 211 may transmit/receive packets to/from the host device 100. A packet transmitted from the host device 100 to the host interface 211 may include a command or data to be written in the non-volatile memory 220, and a packet transmitted from the host interface 211 to the host device 100 may include a response to a command or data read from the non-volatile memory 220. The memory interface 212 may transmit data to be written in the non-volatile memory 220 to the non-volatile memory 220 or may receive data read from the non-volatile memory 220. The memory interface 212 may be implemented to comply with standard protocols, such as toggle or open NAND flash interface (ONFI).

The FTL 214 may perform various functions, such as address mapping, wear-leveling, and/or garbage collection. The address mapping operation is an operation of changing a logical address received from the host into a physical address used to actually store data in the non-volatile memory 220. The wear-leveling is technology for preventing or reducing excessive deterioration of a specific block by uniformly using blocks in the non-volatile memory 220, and may be implemented through, for example, firmware technology that balances erase counts of physical blocks. The garbage collection is a technique for securing usable capacity in the non-volatile memory 220 by copying valid data of a block to a new block and then erasing the old block.

The packet manager 215 may generate a packet depending on an interface protocol negotiated with the host device 100 or parse various types of information from a packet received from the host device 100. In addition, the buffer memory 216 may temporarily store data to be written to the non-volatile memory 220 or data to be read from the non-volatile memory 220. The buffer memory 216 may be a component included in the storage controller 210, but may be disposed outside the storage controller 210.

The ECC engine 217 may perform error detection and correction functions on read data read from the non-volatile memory 220. In more detail, the ECC engine 217 may generate parity bits for write data to be written in the non-volatile memory 220, and the parity bits generated in this way may be stored in the non-volatile memory 220 together with write data. When reading data from the non-volatile memory 220, the ECC engine 217 may correct an error of the read data using parity bits read from the non-volatile memory 220 together with the read data, and output read data having the errors corrected.

The AES engine 218 may perform at least one of an encryption operation and a decryption operation on data input to the storage controller 210 using a symmetric-key algorithm.

FIG. 2 is a block diagram illustrating a host-storage system 20 according to some example embodiments.

The host-storage system 20 may include a host device 300, a first storage device 400 and a second storage device 500. Here, the host device 300 and the first and second storage devices 400 and 500 may correspond to the host device 100 and the storage device 200 described with respect to FIG. 1, respectively, and already given descriptions of components included in each element are omitted.

In addition, two storage devices (the first and second storage devices 400 and 500) are shown in FIG. 2, but the host-storage system 20 is not limited thereto, and the host-storage system 20 may include a plurality of storage devices.

In some example embodiments, the first storage device 400 may provide the host device 300 with resources required for executing an application so that the host device 300 executes the application, and each of the plurality of storage devices, including the second storage device 500, may allocate a storage space to be used by an application executed in a trusted execution environment (TEE) area to the host device 300 on an application-by-application basis. Here, data to be isolated and stored among pieces of data to be used by an application executed in the TEE area is stored in each storage space of a plurality of storage devices, including the second storage device 500. That is, resources required for application execution may be stored in the first storage device 400, and among pieces of data to be used by applications, data to be isolated and stored may be stored in a plurality of storage devices, including the second storage device 500.

In other words, according to the inventive concepts, among pieces of data to be used by an application, data to be stored separately and resources required for execution of the application may each (partially or wholly) be physically isolated and stored on different storage devices. In addition, among the pieces of data to be used by the application, the data to be isolated and stored may be, for example, bitcoin wallet data, personal biometric information, and/or personal information such as financial information or medical information. Simply, the data to be isolated may be data of a sensitive or private nature, however, the inventive concepts are not limited thereto, and any class of data may be isolated and stored.

Referring to FIG. 2, it may be seen that among resources 30 required for execution of the application and the data to be used by the application, data 40 to be encrypted and stored is shown.

Here, the resources 30 required for application execution may include, for example, a kernel 31, middleware 33, an application programming interface (API) 35, and application execution-related data 37 and 39. In addition, in FIG. 2, a total of two pieces of application execution-related data are shown, including the execution-related data 37 of application 1 and the execution-related data 37 of application 2, but the application execution-related data is not limited thereto, and the number of applications corresponding to execution-related data of the application may be plural. Also, according to some example embodiments, the host-storage system 20 may additionally include a plurality of storage devices including a third storage device, and data to be separately stored among pieces of data to be used by applications may be stored in each of the plurality of storage devices.

The kernel 31 may control or manage, for example, other programs (for example, the middleware 33, the API 35, etc.), or system resources (for example, the host controller 110, the host memory 120, the storage controller 210, or the non-volatile memory 220 described with respect to FIG. 1) used to execute operations or functions implemented in at least one application.

In addition, the kernel 31 may provide an interface through which the middleware 33, the API 35, or at least one application accesses individual components of the host-storage system 20 to control or manage system resources.

The middleware 33 may perform an intermediary role so that, for example, the API 35 or at least one application communicates with the kernel 31 to exchange data.

In addition, the middleware 33 may process one or more task requests received from at least one application based on priority. For example, the middleware 33 may assign a priority for using system resources (for example, the host controller 110, the host memory 120, the storage controller 210, and/or the non-volatile memory 220 described with respect to FIG. 1) of the host-storage system 20 to at least one application. For example, the middleware 33 may perform scheduling or load balancing of one or more task requests by processing one or more task requests based on a priority given to at least one application.

The API 35 is, for example, an interface for at least one application to control functions provided by the kernel 31 or the middleware 33, and may include, for example, at least one interface or function (for example, command) for file control, window control, image processing, or character control.

The execution-related data 37 and 39 of the application may represent data for executing the application in the operating system (OS). For example, the execution-related data 37 and 39 of the application may be an application binary interface (ABI), which is a low-level interface used between an application and an OS, an application and a library, or components of an application.

The first storage device 400 may provide the host device 300 with resources required for executing the application so that the host device 300 executes the application. In some example embodiments, a first storage controller 410 of the first storage device 400 may provide the host device 300 with resources required for executing the application so that the host device 300 executes the application. Here, the resources required for application execution may be the kernel 31, the middleware 33, the API 35, and the execution-related data 37 and 39.

A plurality of storage devices, including the second storage device 500, may allocate a storage space to be used by applications executed in the TEE area to the host device 300 on an application-by-application basis. Here, the TEE is a storage space corresponding to the controller (for example, host controllers 110 and 310 or storage controllers (the storage controller 210, the first storage controller 410, and the first storage controller 510)) of the host-storage systems 10 and 20, and represents a storage space accessible when the controller operates in a secure mode.

In some example embodiments, the second storage controller 510 may allocate a storage space to be used by applications executed in the TEE area to the host device 300 in units of applications (for example, groupings of applications) based on identification information of the host device 300. A method in which the second storage controller 510 allocates the storage space to be used by an application executed in the TEE area to the host device 300 in units of applications based on identification information of the host device 300 is described in some example embodiments with reference to other drawings.

In addition, a plurality of storage devices, including the second storage device 500, may each receive an unlock request for each storage device from the host device 300, and each of the plurality of storage devices, including the second storage device 500, may determine whether to unlock the corresponding storage device. Here, the unlock request for the storage device may include a password input from the user of the application (for example, the user of the user devices shown in FIG. 9), a one-time-password (OTP) randomly generated by the application, and application identification information App ID.

In some example embodiments, the second storage controller 510 may determine whether to unlock the second storage device based on the password input from the user of the application included in the unlock request. A method for the second storage controller 510 to determine whether to unlock the second storage device 500 based on the password input from the user of the application included in the unlock request is described in some example embodiments with reference to other drawings.

In addition, when a corresponding storage device among a plurality of storage devices, including the second storage device 500, is unlocked, the corresponding storage device may read data in response to a read request for data stored in the corresponding storage device from the host device 300.

In some example embodiments, when the second storage device 500 is unlocked, the second storage controller 510 may read data by decrypting a read request for data stored in the second storage device 500 from the host device 300 with the OTP as a key value, the read request being encrypted with the OTP as a key value. Here, additionally, the second storage controller 510 may verify the decrypted read request based on application identification information and a counter value. Here, the counter value may be the number of messages sent or received between a storage controller and a host controller. In addition, the second storage device 500 may encrypt the read data with the OTP as a key value and provide the data to the host device 300.

In addition, when a specific storage device among a plurality of storage devices (storage devices corresponding to applications) including the second storage device 500 is unlocked, the corresponding storage device may write data in response to a write request for data to be written to the corresponding storage device from the host device 300.

In some example embodiments, when the second storage device 500 is unlocked, the second storage controller 510 may write data by decrypting a write request for data to be written to the second storage device 500 from the host device 300 with the OTP as a key value, the write request being encrypted with the OTP as a key value. Here, additionally, the second storage controller 510 may verify the decrypted write request based on application identification information and a counter value.

According to some example embodiments, the host-storage system 20 has an effect of providing a safe storage space between an application and a storage device.

In some example embodiments, the first storage device 400 may provide the host device 300 with resources required for executing the application so that the host device 300 executes the application, and a plurality of storage devices, including the second storage device 500, may provide the host device 300 with separately stored data among pieces of data to be used by an application. That is, by physically isolating the storage device that provides the resources required for the execution of the application from the storage devices that provide isolated and stored data among pieces of data to be used by applications, the host-storage system 20 may have an effect of providing security isolation.

Through this, a storage space for data used by applications running in the TEE environment, that is, security isolation, may be provided to applications of the host-storage system 20 without relying on specific libraries (for example, Intel™'s proprietary SGX protected FS library) or specific software development kits (for example, Intel™'s proprietary SGX protected FS SDK).

In particular, according to the inventive concepts, a security-related intermediary (for example, a counterpart of an untrusted area) of a storage device is not required, thereby eliminating inefficiency in performance. Furthermore, according to the inventive concepts, because there is no intermediary intervention, large-capacity and high-speed file transmission is possible.

In addition, through this, there is an effect of providing security isolation to the host-storage system 20 without having to depend on a specific OS. For example, even if an OS (or hypervisor) is infected with ransomware or malicious code, according to the inventive concepts, a storage device in which application-related data is stored has an effect of safely protecting the corresponding data.

In addition, through this, when a driving environment in which an application is executed is changed, an existing storage device may be used as it is. For example, when the operating environment in which the application is executed is changed from a first virtual machine (VM1 to a second virtual machine VM2, application-related data has to be extracted from the storage corresponding to the first virtual machine VM1, and then the application data has to be written back to the second virtual machine VM2, but according to the inventive concepts, even when a driving environment in which an application is executed is changed, because the storage device providing resources required for execution of the application and the storage device providing separately stored data among pieces of data to be used by the application are physically isolated from each other, the storage device storing application-related data may be used as it is. That is, even if the operating environment of the application changes, there is no need to allocate storage space for application-related data in a new storage device.

In addition, conventionally, because encrypted data is stored in an untrusted area (for example, SSD), encrypted data is vulnerable to replay attack or version rollback attack, but according to the inventive concepts, because access to a storage device is impossible (or, alternatively, difficult, or prevented or reduced likelihood) in an untrusted area, a replay attack and a file version rollback attack on encrypted data may be prevented or reduced. As such, safe and reliable storage of data may be achieved. Alternatively, or additionally, as described above, because data may be more securely kept, operation of the associated hardware may occur as expected after an attempted attack, such as a replay attack or file version rollback attack, and thus prevent or reduce malfunctions and/or other complications.

In addition, according to the inventive concepts, because an existing storage device is used, an additional hardware security element (for example, microSD, SIM, or eSE) is not required, thereby reducing resources (cost or additional circuitry).

In the past, resources and applications required for the execution of an OS (or application) corresponded to one storage device, but according to the inventive concepts, among the pieces of data to be used by resources and application required for the execution of the OS (or application), isolated and stored data may correspond to the plurality of storage devices to be isolated from each other, which may be based on a decrease in trust in the OS and trust in the user's own application.

On the other hand, according to some example embodiments, the storage device may include a first non-volatile memory, a second non-volatile memory that is different from the first non-volatile memory, and a storage controller, may provide the host device with resources required for executing the application from the first non-volatile memory so that the host device executes the application, may receive a request for allocating a storage space corresponding to at least one application from the host device, and may allocate a storage space to be used by an application executed in the TEE area to the host device in units of applications in the second non-volatile memory based on identification information of the host device included in the allocation request. Here, the first non-volatile memory and the second non-volatile memory may respectively correspond to the first non-volatile memory 420 of the first storage device 400 and the second non-volatile memory 520 of the second storage device 500 described with respect to FIG. 2, and the first storage controller 410 and the second storage controller 510 described with respect to FIG. 2 may correspond to the storage controller.

Figure 3:
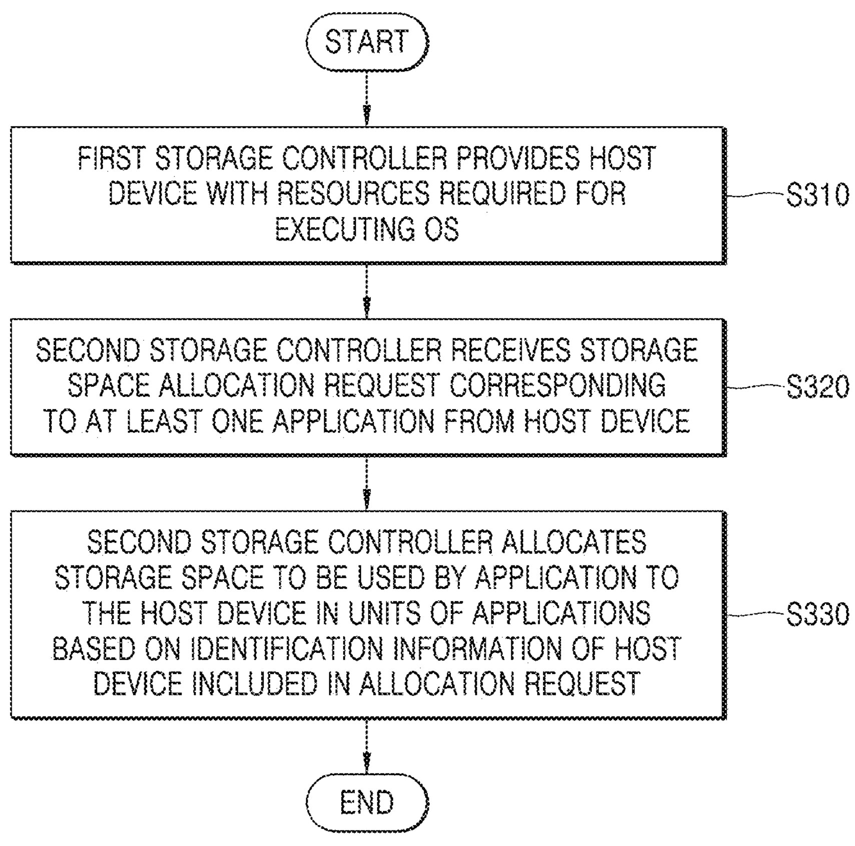
FIG. 3 is a flowchart illustrating a method of operating a storage device, according to some example embodiments.

FIG. 3 is a flowchart illustrating a method of operating a storage device, according to some example embodiments.

Referring to FIG. 3, in operation S310, the first storage controller 410 of the first storage device 400 may provide the host device 300 with resources required for executing the application so that the host device 300 executes the application. Here, resources required for application execution may be the kernel 31, the middleware 33, the API 35, and the application execution-related data 37 and 39.

In some example embodiments, the first storage controller 410 of the first storage device 400 may provide the host device 300 with resources required for the execution of a hypervisor capable of changing an operating environment of an application as well as resources required for the execution of an OS (or application).

Referring to FIG. 3, in operation S320, the second storage controller 510 of the second storage device 500 may receive a storage space allocation request corresponding to at least one application from the host device 300. In some example embodiments, the storage space allocation request may include requesting identification information of the storage device. The identification information may be, for example, a certificate of the storage device itself or a certificate of the manufacturer.

Referring to FIG. 3, in operation S330, the second storage controller 510 may allocate a storage space to be used by an application executed in a TEE area to the host device 300 in units of applications based on identification information of the host device 300 included in the allocation request.

Figure 4:
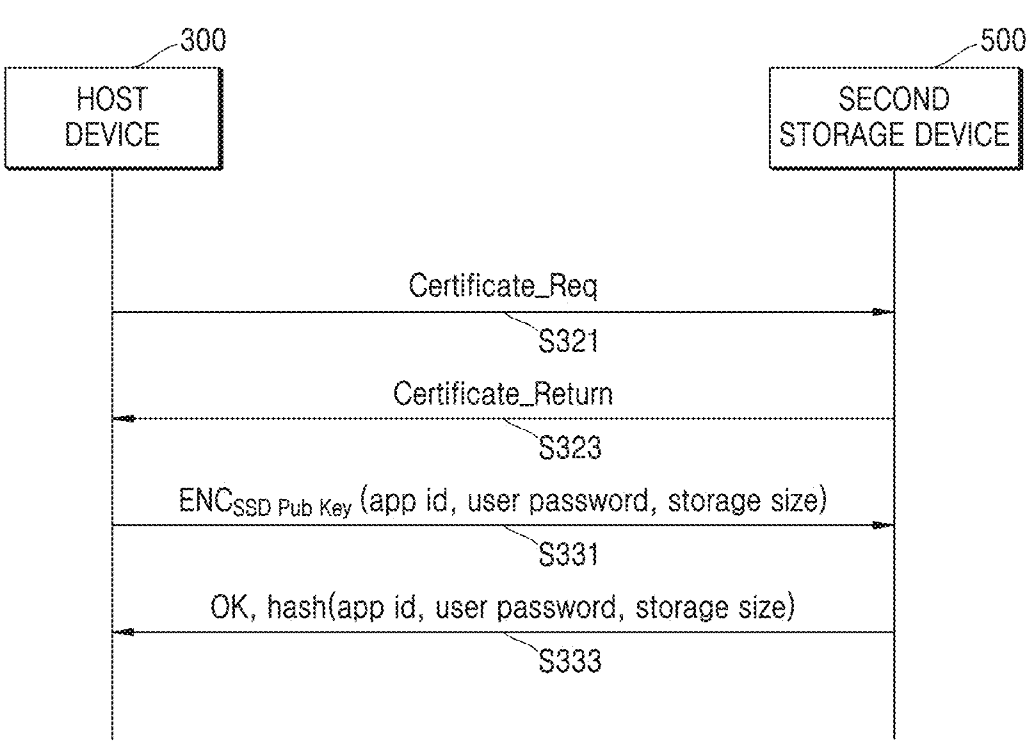
FIG. 4 is a diagram illustrating a method of operating a storage device, according to some example embodiments.

Referring to FIG. 4, operations S320 and S330 are described in some example embodiments.

FIG. 4 is a diagram illustrating a method of operating a storage device, according to some example embodiments.

In operation S321, the host device 300 may request identification information of the second storage device 500 from the second storage device 500 in order to be allocated a storage space corresponding to an application to be executed. That is, the host device 300 requests identification information of the second storage device 500 from the second storage device 500, which is different from the first storage device 400 that provides resources required for application execution, in order to be allocated a storage space to be used by the application executed in the TEE area. Here, the identification information may be a certificate of the storage device itself or a certificate of the manufacturer.

In operation S323, the second storage device 500 may provide identification information of the second storage device 500 requested by the host device 300 to the host device 300. In some example embodiments, the second storage controller 510 may provide the host device 300 with identification information of the storage device requested by the host device 300.

The host device 300 may verify the obtained identification information of the second storage device 500. In some example embodiments, the host device 300 may determine whether a certificate included in the identification information of the storage device is a trustworthy certificate.

In operation S331, when the certificate is a trusted certificate, the host device 300 may encrypt identification information of the host device 300 and required storage space information with a public encryption key of the second storage device 500 and provide the encrypted identification information of the host device 300 and required storage space information to the second storage device 500. Here, the identification information of the host device 300 may include application identification information APP ID to be run in the host device 300 or a self-encrypting drive (SED) unlock key. In addition, the SED unlock key may include a user password, PIN code, pattern input, and/or the like.

In addition, the second storage device 500 may decrypt identification information of the host device 300 and required storage space information encrypted by the host device 300 with the public encryption key of the second storage device 500 using the secret encryption key of the second storage device 500 corresponding to the public encryption key. In some example embodiments, the second storage controller 510 may decrypt identification information of the host device 300 and required storage space information encrypted by the host device 300 with the public encryption key of the second storage device 500 using the secret encryption key of the second storage device 500 corresponding to the public encryption key.

The second storage controller 510 may allocate a storage space to be used by the application running in the TEE area to the host device 300 in units of applications based on the decrypted identification information of the host device 300 and required storage space information.

In this regard, the second storage controller 510 may determine whether the SED unlock key included in the decrypted identification information of the host device 300 corresponds to the SED unlock key of the second storage device 500, and may determine whether the second storage device 500 may provide a storage space corresponding to required storage space information.

In addition, when the SED unlock keys correspond to each other and the second storage device 500 provides a storage space corresponding to information on the required storage space, the second storage controller 510 may allocate storage space to the host device 300 for an application corresponding to application identification information APP ID.

Then, the second storage controller 510 may generate a hash value for the decrypted identification information of the host device 300 and allocated storage space information based on a hash function. In operation S333, the second storage controller 510 may provide the generated hash value to the host device 300. The host device 300 may confirm that the storage space corresponding to the application has been allocated based on the obtained hash value.

In this regard, when the SED unlock keys do not correspond to each other or the second storage device 500 does not provide a storage space corresponding to information on the required storage space (for example, when the storage space allocation fails), the second storage controller 510 may provide a null value to the host device 300.

Hereafter, referring to FIGS. 5 to 8, a method of device unlocking, reading, and writing by a storage device including a storage space corresponding to an application in the host-storage system 20 is explained in some example embodiments.

Figure 5:
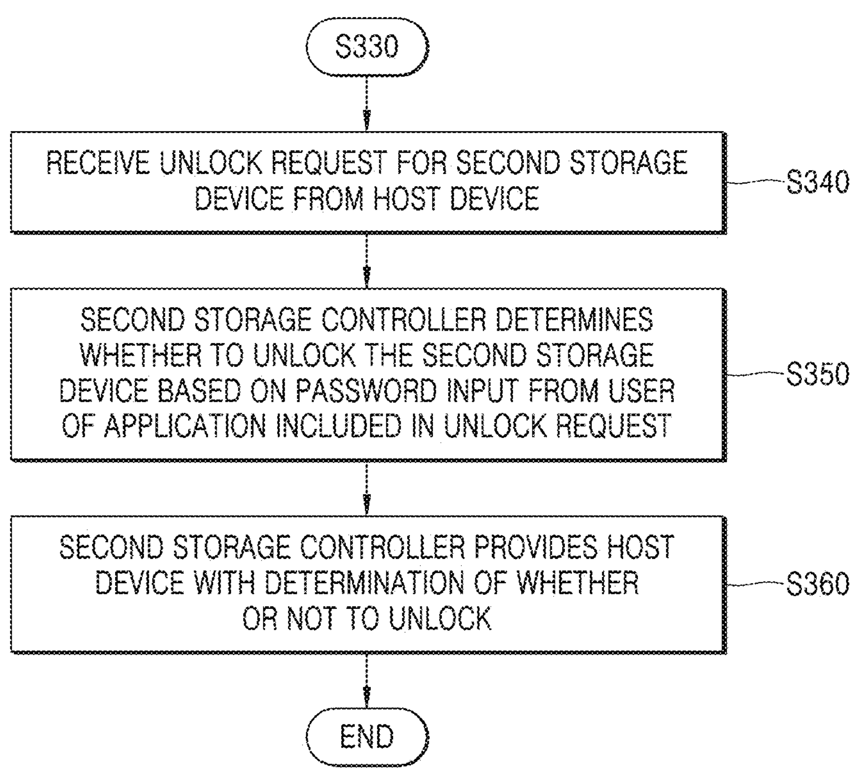
FIGS. 5 to 7 are flowcharts illustrating a method of operating a storage device, according to some example embodiments.
Figure 6:
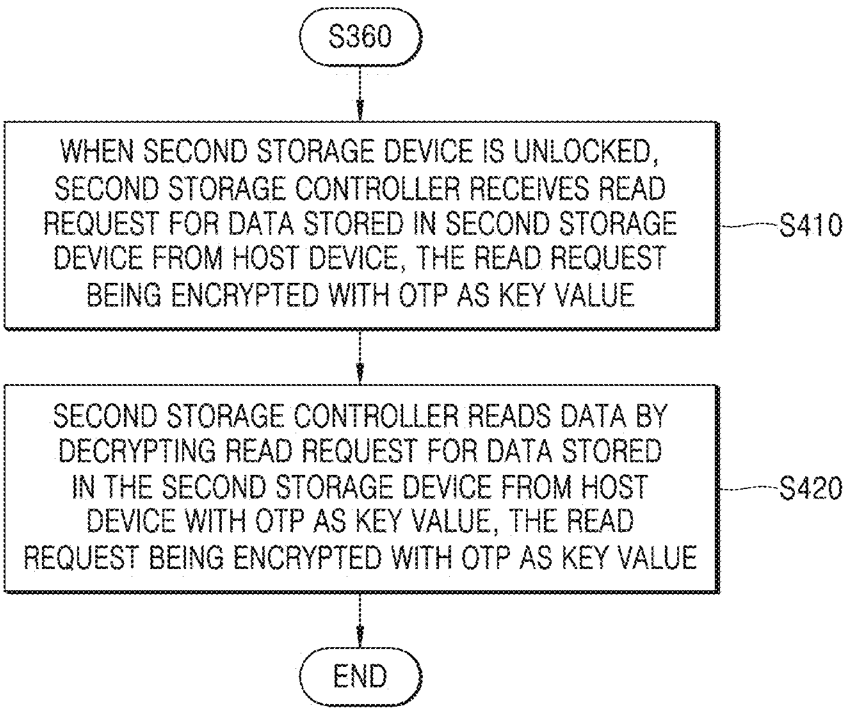
Figure 7:
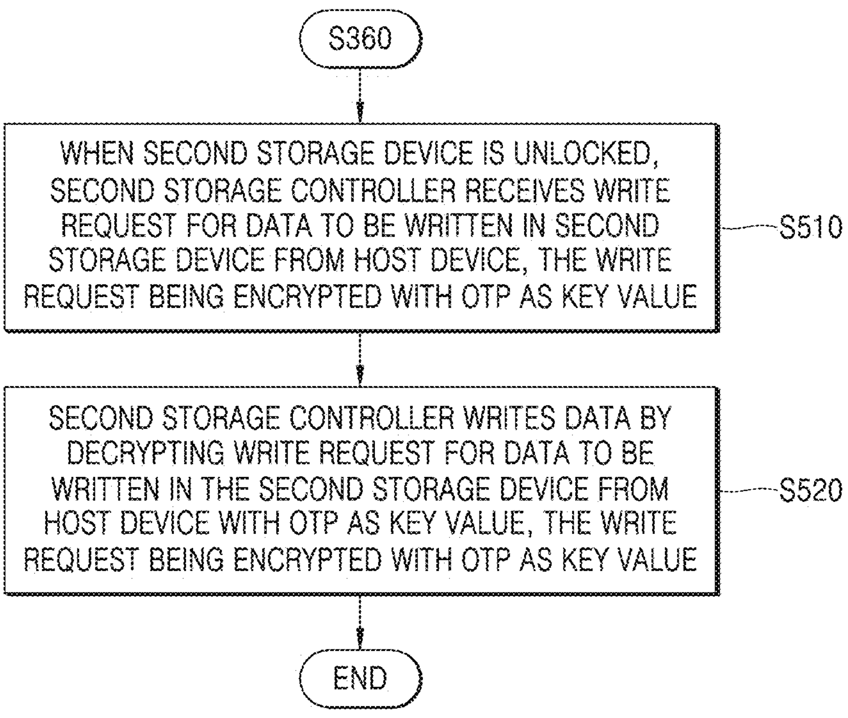

FIGS. 5 to 7 are flowcharts illustrating a method of operating a storage device, according to some example embodiments.

Referring to FIG. 5, in operation S340, the second storage device 500 may receive an unlock request for the second storage device 500 from the host device 300. Here, the unlock request for the storage device may occur when an application starts running in the host device 300, and may be requested for a storage device that has allocated a storage space corresponding to the application. In addition, the unlock request for the storage device may include the password input from a user of the application, the OTP randomly generated by the application, and the application identification information App ID.

Referring to FIG. 5, in operation S350, the second storage controller 510 may determine whether to unlock the second storage device 500 based on the password input from the user of the application included in the unlock request. That is, according to the inventive concepts, the function of the password input from the user may correspond to the function of the key for unlocking the SED.

Referring to FIG. 5, in operation S360, the second storage controller 510 may provide the host device 300 with the determination result of whether or not to unlock the second storage device.

Regarding data reading, referring to FIG. 6, in operation S410, when the second storage device 500 is unlocked, the second storage controller 510 may receive a read request for data stored in the second storage device 500 encrypted with the OTP as a key value from the host device 300.

Referring to FIG. 6, in operation S420, the second storage controller 510 may read data by decrypting a read request for data stored in the second storage device 500 from the host device 300 with the OTP as a key value, the read request being encrypted with the OTP as a key value.

Regarding data writing, referring to FIG. 7, in operation S510, when the second storage device 500 is unlocked, the second storage device 500 may receive a write request for data to be written to the second storage device 500 encrypted with the OTP as a key value from the host device 300.

Referring to FIG. 7, in operation S520, the second storage controller 510 may write data by decrypting a write request for data to be written to the second storage device 500 with the OTP as a key value, the write request being encrypted with the OTP as a key value.

Figure 8:
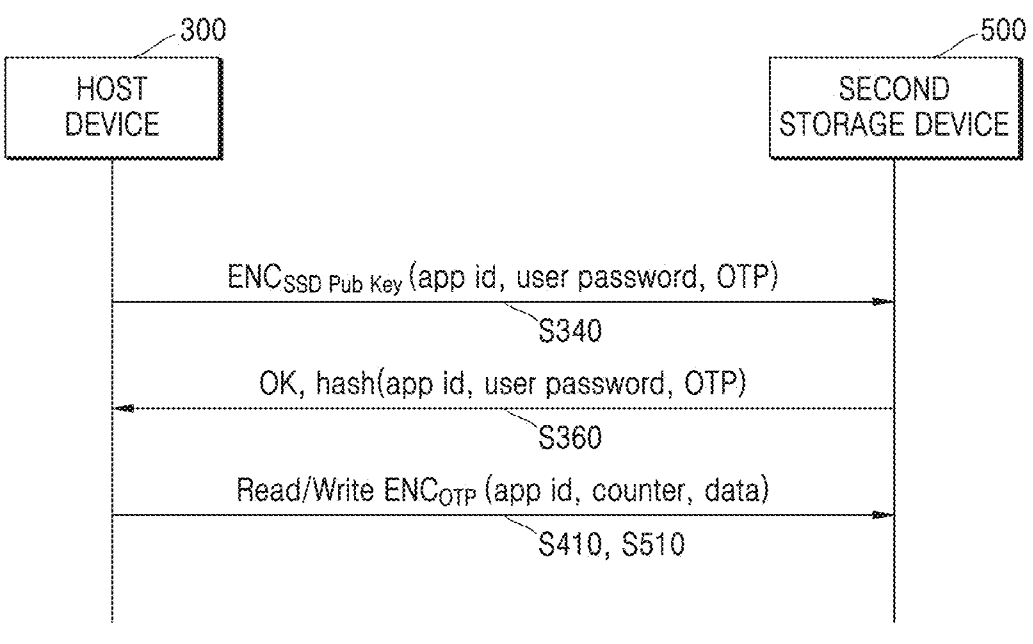
FIG. 8 is a diagram illustrating a method of operating a storage device, according to some example embodiments.

Referring to FIG. 8, a method of device unlocking, reading, and writing in a storage device according to some example embodiments is described in some example embodiments.

FIG. 8 is a diagram illustrating a method of operating a storage device, according to some example embodiments.

In operation S340, to unlock the storage device, the host device 300 may encrypt an unlock request for the second storage device 500 including the password entered by the user of the application, the OTP randomly generated by the application, and the application identification information App ID with the public encryption key of the second storage device 500, and may transmit an unlock request for the encrypted second storage device 500 to the second storage device 500.

The second storage device 500 may receive an unlock request for the second storage device 500 from the host device 300, and the second storage controller 510 may determine whether to unlock the second storage device 500 based on the password input from the user of the application included in the unlock request.

In this regard, the second storage controller 510 may decrypt the unlock request for the encrypted second storage device 500 with the secret encryption key of the second storage device 500 corresponding to the public encryption key. Then, the second storage controller 510 determines whether the decrypted password matches the SED key of the second storage device 500, and when the SED key matches the password, the second storage controller 510 may determine that the second storage device 500 is unlocked.

When the second storage device 500 is unlocked, the second storage controller 510 may generate hash values for the obtained password, the OTP randomly generated by an application, and the application identification information App ID based on a hash function. In operation S360, the second storage controller 510 may provide the generated hash value to the host device 300. The host device 300 may confirm that the second storage device 500 is unlocked based on the obtained hash value.

In this regard, when the decrypted password does not match the SED key of the second storage device 500, the second storage controller 510 may provide a null value to the host device 300.

Regarding data reading, the host device 300 may encrypt a read request for data stored in the second storage device 500 with the transmitted OTP as a key value, and may transmit a read request for data stored in the second storage device to the second storage device 500, the read request being encrypted with the OTP as a key value.

In addition, the second storage controller 510 may read the data by decrypting the encrypted read request for data stored in the second storage device 500 with the OTP obtained in operation S340 as a key value.

In addition, the second storage device 500 may encrypt the read data with the OTP as a key value and provide the data to the host device 300.

Regarding data writing, the host device 300 may encrypt a write request for data to be written to the second storage device 500 with the transmitted OTP as a key value, and may transmit the write request for data to be written to the second storage device encrypted with the OTP as a key value to the second storage device 500.

In addition, the second storage controller 510 may write data by decrypting a write request for data to be written to the encrypted second storage device 500 with the OTP obtained in operation S340 as a key value.

That is, in relation to reading/writing data, encryption/decryption is performed between the host device and the storage device using symmetric key encryption/decryption with the OTP obtained/provided in operation S340 as a key value.

In some example embodiments, each of the read request for data stored in the second storage device 500 and the write request for data to be written in the second storage device 500 may include application identification information APP ID and a counter value. The second storage controller 510 may verify each of the read request and the write request based on the identification information of application APP ID and the counter value included in each of the read request and the write request. By checking the identification information APP ID and counter value of the application included in the decrypted read request and write request, it is possible to prevent or reduce data overwrite and replay attack through authentication of the sender and random data transmission.

Figure 9:
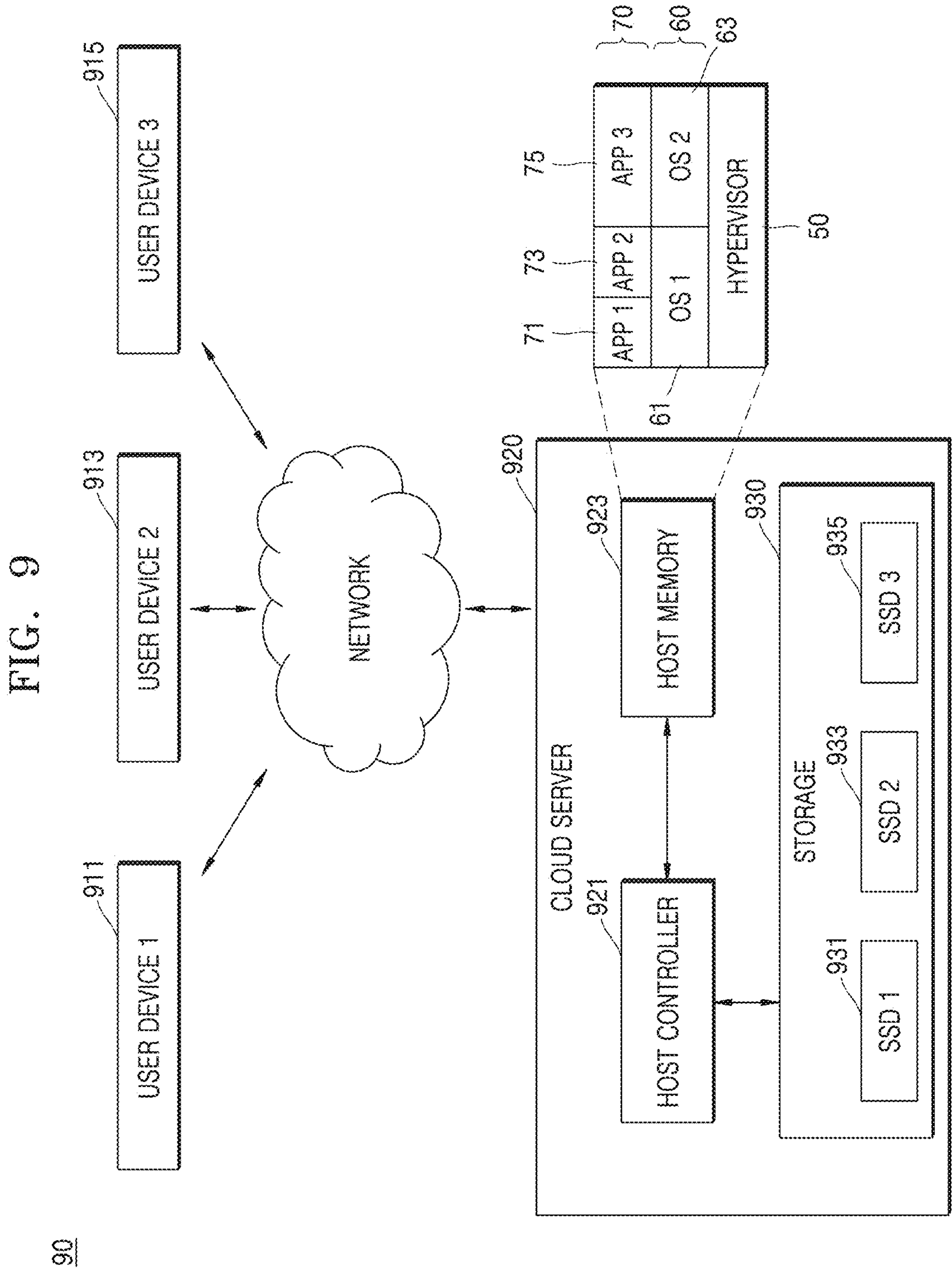
FIG. 9 is a block diagram illustrating a system according to some example embodiments.

FIG. 9 is a block diagram illustrating a system 90 according to some example embodiments.

Referring to FIG. 9, the system 90 may include user devices 911, 913, and 915 and a cloud server 920. Here, the user devices 911, 913, and 915 and the cloud server 920 are connected to each other through a network. The network may consist of the Internet, a wireless broadband (Wibro) network, a world interoperability for microwave access (Wimax) network, a mobile communication network including code division multiple access (CDMA), wideband CDMA (WCDMA), long term evolution (LTE), or a combination thereof. In addition, the cloud server 920 may correspond to the host devices 100 and 300.

In addition, the cloud server 920 may include a host controller 921, a host memory 923, and a storage unit 930. In addition, the storage unit 930 may include a plurality of storage devices including a first storage device 931, a second storage device 933, and a third storage device 935.

In addition, it may be seen that a hypervisor 50, resources 60 required for execution of an OS (or resources 60 required for the execution of applications), and an application 70, corresponding to the host memory 923 are illustrated in FIG. 9. Here, the hypervisor 50 is software that allows a different OS to operate in one computer system, and represents a kind of middleware between the CPU and the OS.

The components described above may correspond to the components described with respect to FIG. 2, respectively, and the already given descriptions of the components are omitted.

Referring to FIG. 9, it may be seen that the cloud server 920 executes an application 1 71 and an application 2 73 based on an OS 1 61 and executes an application 3 75 based on an OS 2 63, through the hypervisor 50.

In some example embodiments, the cloud server 920 may receive resources required for application execution from the first storage device 931 to execute the application 1 71 and the application 2 72, and may receive isolated and stored data among pieces of data to be used by the application 1 71 and the application 2 73 from the second storage device 933 or the third storage device 935, not from the first storage device 931. Through this, by physically isolating a storage device that provides resources required for execution of an application and storage devices that provide isolated and stored data among pieces of data to be used by the application from each other, security isolation may be provided to the system 90.

According to the inventive concepts, by providing a safe storage space between an application and a storage device, a single safe storage device may be accessed by a plurality of applications. For example, in the case of medical service-related applications, even if users with authentication information only access the application with their respective user devices, users (patients, doctors, insurance companies, etc.) may obtain patient medical information or DNA information stored in a single safe storage device. That is, according to the inventive concepts, users having authentication information may safely share corresponding information.

As described herein, any electronic devices and/or portions thereof according to any of the example embodiments may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, modules, units, controllers, circuits, architectures, and/or portions thereof according to any of the example embodiments, and/or any portions thereof.

While the inventive concepts have been particularly shown and described with reference to example embodiments thereof, it will be understood that various changes in form and details may be made therein without departing from the spirit and scope of the following claims.

What is claimed is:

1. A method of operating a plurality of storage devices, the method comprising:

providing, by a first storage controller of a first storage device, resources required for execution of a first application to a host device so that the host device executes the first application;

receiving, by a second storage controller of a second storage device, an allocation request for a storage space corresponding to the first application from the host device; and allocating, by the second storage controller, the storage space to be used by the first application executed in a trusted execution environment (TEE) area to the host device in units of grouped applications based on identification information of the host device included in the allocation request, a first unit of the grouped applications including the first application and a second application, the TEE area based on the first storage controller and the second storage controller, the resources including at least one of a kernel, middleware, an application programming interface (API), or execution-related data of the first application.

2. The method of claim 1, wherein the allocating of the storage space comprises providing, by the second storage controller, identification information of the second storage device requested by the host device to the host device; and verifying identification information of the host device based on a response of the host device to the identification information of the second storage device.

3. The method of claim 2, wherein, based on the response of the host device to a certificate included in the identification information of the second storage device being that the certificate is a trusted certificate, the verifying of the identification information of the host device comprises decrypting, by the second storage controller, identification information of the host device and required storage space information with a secret encryption key of the second storage device corresponding to a public encryption key wherein the identification information of the host device and the required storage space information are included in the response of the host device and encrypted by the host device with the public encryption key of the second storage device; and allocating, by the second storage controller, the storage space to be used by the first application executed in the TEE area to the host device in the units of applications based on the decrypted identification information of the host device and the required storage space information.

4. The method of claim 3, wherein the allocating of the storage space comprises determining, by the second storage controller, whether a self-encrypting drive (SED) unlock key included in the decrypted identification information of the host device corresponds to the SED unlock key of the second storage device.

5. The method of claim 4, wherein the allocating of the storage space comprises generating, by the second storage controller, a hash value for the identification information of the host device and information on the allocated storage space based on a hash function; and providing, by the second storage controller, the generated hash value to the host device.

6. The method of claim 1, further comprising:

receiving, by the second storage device, an unlock request for the second storage device from the host device;

determining, by the second storage controller, whether to unlock the second storage device based on a password input from a user of the first application included in the unlock request; and providing, by the second storage controller, a determination result of whether or not to unlock the second storage device to the host device.

7. The method of claim 6, further comprising:

receiving, by the second storage controller, a read request for data stored in the second storage device, decrypting, by the second storage controller, based on the second storage device being unlocked, the read request for the data stored in the second storage device using a one-time password (OTP) as a key value, wherein the read request has been encrypted using the OTP as the key value, and reading the data from the second storage device in response to the decrypted read request.

8. The method of claim 7, wherein the reading of the data further comprises verifying, by the second storage controller, the decrypted read request based on identification information of the first application and a counter value before reading the data.

9. The method of claim 6, further comprising:

receiving, by the second storage controller, a write request for data to be written to the second storage device, decrypting, by the second storage controller, based on the second storage device being unlocked, the write request for data to be written to the second storage device using a one-time-password (OTP) as a key value, wherein the write request has been encrypted using the OTP as the key value, and writing the data to the second storage device in response to the decrypted write request.

10. The method of claim 1, wherein the grouped applications includes a second unit including a third application, and the storage space of the first unit and the storage space of the second unit are separate.

11. A storage device comprising:

a first non-volatile memory, a second non-volatile memory that is different from the first non-volatile memory, and a storage controller configured to provide a host device with resources required for execution of a first application from the first non-volatile memory so that the host device executes the first application, receive an allocation request for a storage space corresponding the first application from the host device, allocate the storage space to be used by the first application executed in a trusted execution environment (TEE) area to the host device in the second non-volatile memory in units of grouped applications based on identification information of the host device included in the allocation request, a first unit of the grouped applications including the first application and a second application, the TEE area based on the storage controller, the resources includes at least one of a kernel, middleware, an application programming interface (API), or execution-related data of the first application.

12. The storage device of claim 11, wherein the storage controller is configured to provide identification information of a non-volatile memory requested by the host device to the host device, and verify the identification information of the host device based on a response of the host device to the identification information of the non-volatile memory.

13. The storage device of claim 12, wherein the storage controller, based on the response of the host device to a certificate included in the identification information of the non-volatile memory being a trusted certificate, is configured to decrypt the identification information of the host device and information on a required storage space with a secret encryption key of the non-volatile memory corresponding to a public encryption key, the identification information of the host device and the information on the required storage space being encrypted by the host device with the public encryption key of the non-volatile memory, and allocate the storage space to be used by the first application executed in the TEE area in the non-volatile memory to the host device in the units of applications based on the decrypted identification information of the host device and the information on the required storage space.

14. The storage device of claim 12, wherein the identification information of the host device is identification information of the first application to be run in the host device.

15. The storage device of claim 13, wherein the storage controller is configured to determine whether a self-encrypting drive (SED) unlock key included in the identification information of the decrypted host device corresponds to the SED unlock key of the non-volatile memory.

16. The storage device of claim 15, wherein the storage controller is configured to generate a hash value for identification information of the host device and information on the allocated storage space based on a hash function, and provide the generated hash value to the host device.

17. The storage device of claim 11, wherein the storage controller is configured to receive an unlock request for the second non-volatile memory from the host device, determine whether to unlock the second non-volatile memory based on a password input from a user of the first application included in the unlock request, and provide the host device with a determination result of whether or not to unlock the second non-volatile memory.

18. A host-storage system comprising:

a host device; and a plurality of storage devices including a first storage device including a first storage controller, and a second storage device including a second storage controller, the first storage controller of the first storage device being configured to provide the host device with resources required for execution of a first application so that the host device executes the first application, the second storage controller of the second storage device being configured to receives an allocation request for a storage space corresponding to the first application from the host device, allocate the storage space to be used by the first application executed in a trusted execution environment (TEE) area to the host device in units of grouped applications based on identification information of the host device included in the allocation request, a first unit of the grouped applications including the first application and a second application, the TEE area based on the first storage controller and the second storage controller, the resources including at least one of a kernel, middleware, an application programming interface (API), or execution-related data of the first application.

19. The host-storage system of claim 18, wherein the second storage controller is configured to provide identification information of the second storage device requested by the host device to the host device, and verify the identification information of the host device based on a response of the host device to the identification information of the second storage device.

20. The host-storage system of claim 19, wherein the identification information of the host device is identification information of an application to be run in the host device.

* * * * *